United States Patent
Leipnitz et al.

(10) Patent No.: US 11,746,894 B2
(45) Date of Patent: Sep. 5, 2023

(54) TRANSMISSION MECHANISM

(71) Applicant: Vitesco Technologies Germany GMBH, Hannover (DE)

(72) Inventors: Klaus Leipnitz, Eckental-Forth (DE); Kiarash Sabzewari, Burglengenfeld (DE); Roger Pohlmann, Fürth-Stadeln (DE); Andreas Riedel, Nuremberg (DE)

(73) Assignee: Vitesco Technologies Germany GmbH, Regensburg (DE)

( * ) Notice: Subject to any disclaimer, the term of this patent is extended or adjusted under 35 U.S.C. 154(b) by 153 days.

(21) Appl. No.: 17/486,019

(22) Filed: Sep. 27, 2021

(65) Prior Publication Data
US 2022/0010879 A1 Jan. 13, 2022

Related U.S. Application Data

(63) Continuation of application No. PCT/EP2020/058179, filed on Mar. 24, 2020.

(30) Foreign Application Priority Data

Mar. 27, 2019 (DE) ...................... 10 2019 204 296.1

(51) Int. Cl.
*F16H 61/04* (2006.01)
*F16H 3/089* (2006.01)
(Continued)

(52) U.S. Cl.
CPC ......... *F16H 61/0403* (2013.01); *F16H 3/089* (2013.01); *F16H 59/40* (2013.01);
(Continued)

(58) Field of Classification Search
CPC .......... F16H 61/04; F16H 3/089; F16H 59/40; F16H 59/42; F16H 2061/047
(Continued)

(56) References Cited

U.S. PATENT DOCUMENTS 6,182,518 B1   2/2001 Baur
6,679,133 B1 * 1/2004 Kayano ................. F16H 63/502
                                                 477/906
(Continued)

FOREIGN PATENT DOCUMENTS

CN       105042067 A     11/2015
DE    102006050517 A1    4/2008
(Continued)

OTHER PUBLICATIONS

International Search Report and Written Opinion dated Jun. 29, 2020 from corresponding International Patent Application No. PCT/EP2020/058179.

(Continued)

*Primary Examiner* — Ha Dinh Ho

(57) ABSTRACT

The disclosure relates to a transmission mechanism with at least two gearwheels that can be brought into form-fitting engagement with one another. One of the gearwheels is designed as a movable gear and, in a disengaged position, is arranged in a freely rotatable manner on a transmission shaft. The other of the gearwheels is designed as a fixed gear and is arranged non-rotatably on a further transmission shaft, the movable gear is connectable non-rotatably to the transmission shaft by a clutch unit and at least one transmission gear can be engaged if a clutch toothing of the clutch unit engages in a form-fitting manner in a toothing of the movable gear in a tooth-on-tooth-gap position. A sensor device detects a rotational speed signal incoming into the other transmission shaft and a rotational speed signal outgoing from the transmission shaft.

10 Claims, 2 Drawing Sheets

(51) Int. Cl.
*F16H 59/40* (2006.01)
*F16H 59/42* (2006.01)
*F16H 3/08* (2006.01)

(52) U.S. Cl.
CPC ...... *F16H 59/42* (2013.01); *F16H 2003/0811* (2013.01); *F16H 2061/047* (2013.01); *F16H 2200/0043* (2013.01)

(58) Field of Classification Search
USPC .......................................................... 74/335
See application file for complete search history.

(56) References Cited

U.S. PATENT DOCUMENTS

| | | | |
|---|---|---|---|
| 7,150,698 B2 * | 12/2006 | Sakamoto | F16H 3/126 |
| | | | 192/48.91 |
| 9,038,493 B2 * | 5/2015 | Iwasaki | F16D 48/06 |
| | | | 74/335 |
| 10,875,409 B2 * | 12/2020 | Manta | F16H 61/0437 |
| 2013/0275015 A1 | 10/2013 | Li | |
| 2014/0309899 A1 | 10/2014 | Li | |
| 2015/0300485 A1 | 10/2015 | Hoefflin | |
| 2018/0119802 A1 | 5/2018 | Takeuchi | |

FOREIGN PATENT DOCUMENTS

| | | |
|---|---|---|
| DE | 102013206216 A1 | 10/2013 |
| DE | 102013224290 A1 | 10/2014 |
| EP | 0857976 A1 | 8/1998 |
| JP | 2014098459 A | 5/2014 |
| JP | 2018071634 A | 5/2018 |
| JP | 2018135999 A | 8/2018 |

OTHER PUBLICATIONS

German Office Action dated Mar. 27, 2019 for corresponding German Patent Application No. 10 2019 204 296.1.
Japanese Office Action dated Dec. 26, 2022 for corresponding Patent Application No. 2021-557171.
German Office Action dated Dec. 2, 2022 for corresponding German Patent Application No. 10 2019 204 296.1.
Japanese Notice of Allowance dated Mar. 1, 2023 for corresponding Patent Application No. 2021-557171.

* cited by examiner

TRANSMISSION MECHANISM

CROSS-REFERENCE TO RELATED APPLICATIONS

This application claims the benefit of PCT Application PCT/EP2020/058179, filed Mar. 24, 2020, which claims priority to German Application 10 2019 204 296.1, filed Mar. 27, 2019. The disclosures of the above applications are incorporated herein by reference.

TECHNICAL FIELD

The disclosure relates to a transmission mechanism.

BACKGROUND

A transmission is generally known as a machine element for converting motion quantities. For this purpose, a transmission includes a drive side, to which a motion quantity of a drive unit is transmitted, and an output side, which is coupled to a work machine. A transmission mechanism transmits the motion quantity incoming from the drive unit to the work machine with a specific transmission ratio.

As a transmission, what are referred to as toothed gearings are known, for example, which in the simplest case have two gearwheels that can be brought into engagement with one another in a form-fitting manner. The gearwheels have teeth that are evenly distributed over a circumference of the gearwheel and are separated from one another by gaps.

Such toothed gearings are used, for example, in vehicle transmissions, by way of which a rotational speed of an engine, for example, of an internal combustion engine, is converted into a wheel rotational speed required for a driving mode of the vehicle. In particular, a torque incoming from the engine is transmitted to a transmission input shaft on which a plurality of pairs of gearwheels are arranged. A pair of gearwheels forms a transmission ratio for a gear stage. The torque is transmitted with the appropriate transmission ratio to a transmission output shaft that is coupled to the output. Vehicle transmissions can be designed as manual transmissions, automated transmissions or automatic transmissions, for example.

For example, in automated transmissions, the transmission input shaft and transmission output shaft (also referred to as the main shaft) run coaxially to one another, with these being coupled to an axially parallel countershaft. The main shaft and countershaft can be brought into engagement with one another selectively via a plurality of pairs of gearwheels with a different transmission ratio with, for example, in each case a fixed gear arranged non-rotatably on the countershaft and a movable gear mounted rotatably on the main shaft, by engaging a clutch unit that is actuable by an external force. The clutch unit is arranged, for example, between the movable gear in question and the main shaft and has a clutch element with a toothing, by way of which the clutch element can be brought into engagement with the corresponding movable gear in a form-fitting manner. As a result, the movable gear can be connected non-rotatably to the main shaft. For a form-fitting engagement between the movable gear and the clutch unit, a tooth-on-tooth-gap position between the toothing of the movable gear and the clutch toothing is required.

SUMMARY

The disclosure provides a transmission mechanism which is improved in relation to the prior art. In the case of a transmission mechanism according to the disclosure for a transmission with at least two gearwheels that can be brought into form-fitting engagement with one another, one of the gearwheels is designed as a movable gear and, in a disengaged position, is arranged in a freely rotatable manner on a transmission shaft. The other gearwheel is designed as a fixed gear and is arranged non-rotatably on a further transmission shaft. The movable gear is connectable here non-rotatably to the transmission shaft by a clutch unit and thus at least one transmission gear can be engaged if a clutch toothing engages in a form-fitting manner in a toothing of the movable gear in a tooth-on-tooth-gap position. A clutch toothing here means a toothing, for example, a tooth profile of the clutch unit. Furthermore, a sensor device is provided, by way of which a rotational speed signal incoming into the other transmission shaft and a rotational speed signal outgoing from the transmission shaft are detectable, where the sensor device is coupled to a control unit, by way of which, for each detected edge in the respective rotational speed signal, a time stamp can be determined and stored and by way of which an angular position of the toothing of the movable gear relative to the transmission shaft can be determined after an initial engagement of the at least one transmission gear and can be assigned to the time stamp. Using the time stamp and the angular position assigned to the time stamp, an absolute angular relationship between the toothing of the movable gear and the clutch toothing can subsequently be determined.

The transmission mechanism permits a reliable and simple, and also quick form-fitting connection between the movable gear and the clutch unit. If the transmission is a vehicle transmission, the transmission mechanism shortens the engagement of a transmission gear and reduces the noise that occurs in the process, by the form-fitting connection taking place only when a tooth-on-tooth-gap position is or has been reliably detected. A jamming and/or delayed form-fitting connection between the movable gear and the clutch unit can thus be avoided. This results in a quick, comfortable, and low-noise, shifting operation with reduced losses of torque.

In some examples, the control unit activates the clutch unit depending on the absolute angular relationship.

The control unit here can monitor a clutch region between the movable gear and the clutch unit, for example, continuously or, for example, in an event-controlled or time-controlled manner. The control unit may use the absolute angular relationship to determine a tooth-on-tooth-gap position between the toothing of the movable gear and the clutch toothing, where the clutch unit is activated in such a way that the clutch unit and the movable gear are left in the detected position. If, on the other hand, the control unit determines a tooth-before-tooth position, the clutch unit is moved relative to the movable gear, for example, rotated step by step into a tooth-on-tooth-gap position.

The control unit is, for example, a transmission control unit of a motor vehicle.

In some implementations, the sensor device has at least two rotational speed sensors. One rotational speed sensor detects the rotational speed signal incoming into the other transmission shaft and the other rotational speed sensor detects the rotational speed signal outgoing from the transmission shaft.

The current rotational speeds at the transmission input and transmission output may be detected using the rotational speed sensors. For this purpose, one rotational speed sensor is arranged at or on a transmission input shaft and the other rotational speed sensor is arranged at or on a transmission output shaft. The control unit can use the rotational speed signals detected by the rotational speed sensors to determine the absolute angular relationship, such as, the angular position, between the toothing of the movable gear and the clutch toothing and thus the relevant transmission shaft after the at least one transmission gear has been initially engaged. Even after the at least one transmission gear has been disengaged, the absolute angular relationship can be continuously determined.

In some implementations, the rotational speed sensors are each designed as a Hall sensor. For example, for this purpose, a magnet is attached to the at least one movable gear (or to another gearwheel arranged on the transmission input shaft), by way of which the movable gear is designed as what is referred to as a magnet wheel, for example with a magnetic dipole. When the movable gear rotates, a rotating magnetic field is created, the size of which changes with the teeth and tooth gaps. This can be detected by the Hall sensor, which can be arranged at another location in the transmission, for example in the control unit. Alternatively, what are referred to as back-biased Hall sensors can also be used, which detect rotational speed signals directly at the corresponding gearwheel. Furthermore, the rotational speed sensors can also be designed as inductive sensors.

In some examples, the clutch unit is designed as a claw clutch. The clutch unit may be formed in two parts and has a first claw element and a second claw element, where the first claw element is connected non-rotatably to the transmission shaft and where the second claw element is formed integrally with the movable gear. The first claw element may be arranged in such a way that it rotates together with the transmission shaft, but is axially displaceable relative to the latter. Since the first claw element is connected non-rotatably to the transmission shaft, a position of the clutch toothing relative to the transmission shaft does not change. As a result, the position, for example, the angular position, of the toothing of the movable gear can be detected and/or determined on the basis of the evaluation of the rotational speed sensors. In this case, the movable gear is connected, for example, integrally to the second claw element, and therefore the toothing of the movable gear corresponds to the toothing of the first claw element.

In some implementations, the transmission is a vehicle transmission. The transmission mechanism can thus be used in motor vehicles to increase driving comfort.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
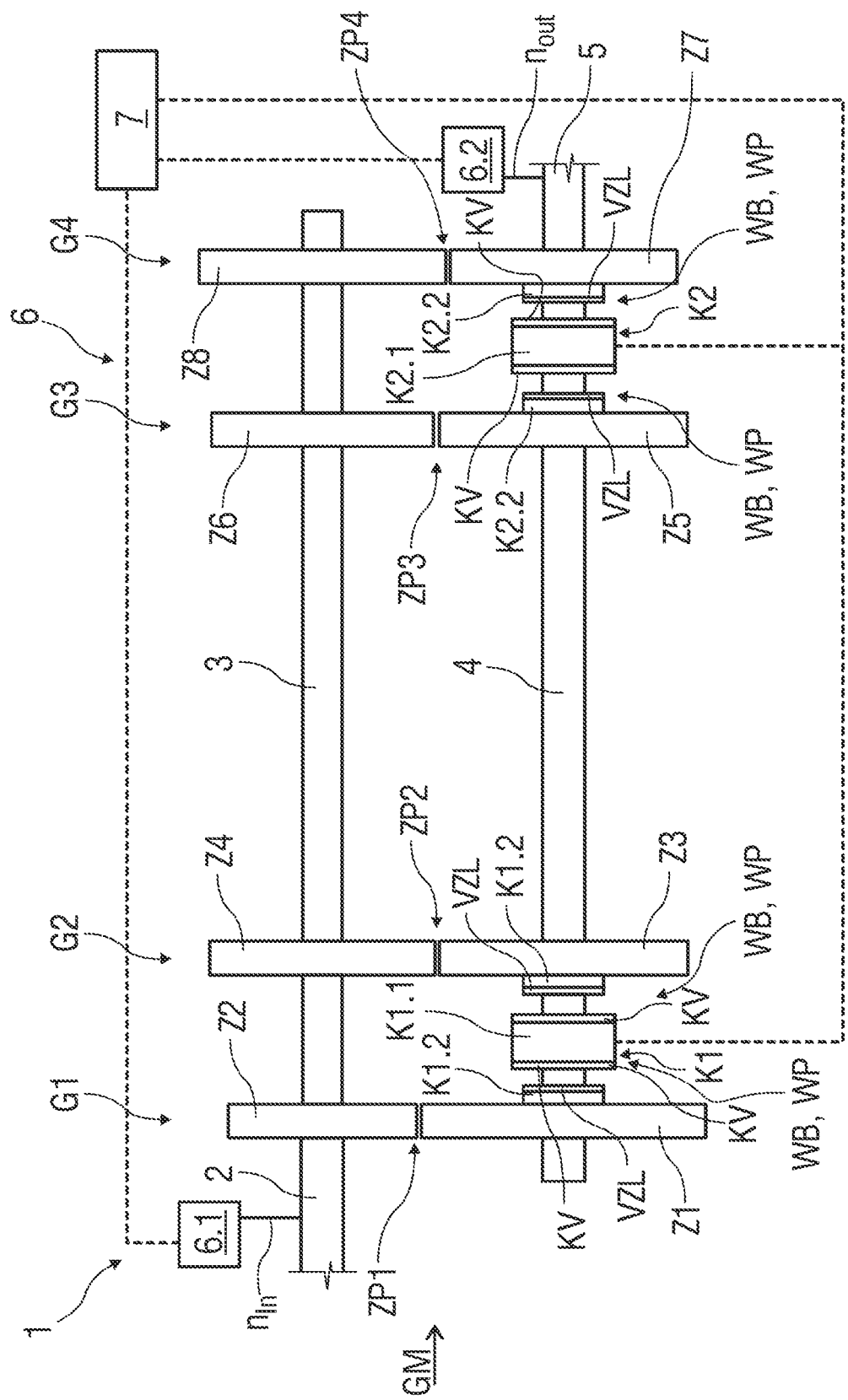
FIG. 1 schematically shows a transmission with a transmission mechanism.

FIG. 1 schematically shows a transmission 1 with a transmission mechanism GM. The transmission 1 has a transmission input shaft 2 coupled to a drive unit (not shown specifically), for example an internal combustion engine. The transmission input shaft 2 forms the drive shaft and thus the drive side of the transmission 1.

As shown, the transmission 1 is a vehicle transmission and is based on an automated transmission in which a second transmission shaft 4 running parallel to a first transmission shaft 3 is arranged. The first transmission shaft 3 is also referred to as a countershaft and is arranged coaxially with respect to the transmission input shaft 2. The transmission input shaft 2 and the first transmission shaft 3 are depicted integrally as shown. Alternatively, these can also be formed separately and connected to each other. The second transmission shaft 4 forms the output shaft of the transmission 1 and is arranged coaxially with respect to a transmission output shaft 5. The second transmission shaft 4 and the transmission output shaft 5 are also depicted integrally. Alternatively, these can also be formed separately and connected to each other.

The transmission input shaft 2 and the second transmission shaft 4 are mechanically coupled to each other by a first pair of gearwheels ZP1, including the gearwheels Z1, Z2. As shown, the transmission 1 has a total of four pairs of gearwheels ZP1 to ZP4 and thus four engageable transmission gears G1 to G4, also referred to as transmission stages or gear stages. Alternatively, the transmission 1 can also have fewer than four or more than four engageable transmission gears G1 to G4.

The first transmission shaft 3 is also mechanically coupled to the second transmission shaft 4. For this purpose, further gearwheels Z3, Z5, Z7 are arranged on the second transmission shaft 4, the further gearwheels being in constant engagement in pairs with further gearwheels Z4, Z6, Z8 arranged on the first transmission shaft 3 and thus providing different transmission ratios for the transmission gears G1 to G4.

In each pair of gearwheels ZP1 to ZP4, the gearwheels Z2, Z4, Z6, Z8 are each arranged non-rotatably on the first transmission shaft 3 and are therefore referred to further as fixed gears Z2, Z4, Z6, Z8. The other gearwheels Z1, Z3, Z5, Z7 are each arranged in a freely rotating and axially fixed manner on a section of the second transmission shaft 4 designed as a hollow shaft and are therefore referred to below as movable gears Z1, Z3, Z5, Z7.

A first clutch unit K1 is arranged between the movable gears Z1, Z3. Furthermore, a second clutch unit K2 is arranged between the movable gears Z5, Z7. The clutch units K1, K2 are used for shifting, such as, engaging the transmission gears G1 to G4, and are each designed as what is referred to as a claw clutch.

The clutch units K1, K2 each have a first claw element K1.1, K2.1 which is arranged non-rotatably on the second transmission shaft 4. For example, the first claw element K1.1, K2.1 is arranged in such a way that it rotates together with the second transmission shaft 4, but is axially displaceable relative to the latter.

The clutch units K1, K2 furthermore each have two second claw elements K1.2, K2.2 which are each arranged coaxially opposite the first claw element K1.1, K2.1 on the second transmission shaft 4. Furthermore, the second claw elements K1.2 and K2.2 are formed integrally with the movable gears Z1, Z3, Z5, Z7.

Figure 2:
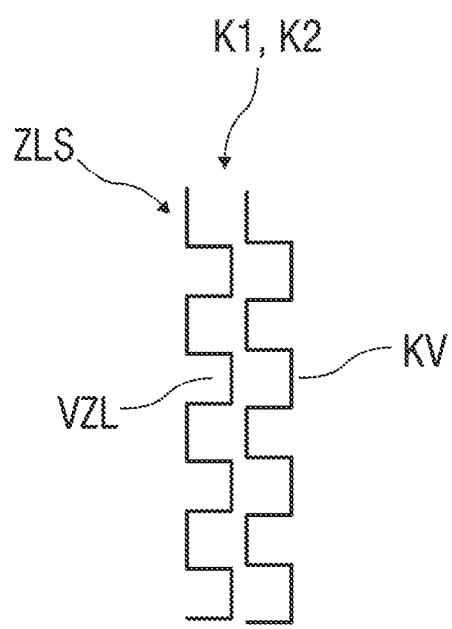
FIG. 2 schematically shows a detail of a top view of a form-fitting connection between a movable gear and a claw element of the transmission.

Those surfaces of the first claw element K1.1, K2.1 which each face the movable gears Z1, Z3, Z5, Z7 have a clutch toothing KV which is illustrated abstractly in FIG. 1 and in sections in FIG. 2. Likewise, a corresponding toothing VZL is formed on those surfaces of the second claw elements K1.2, K2.2 which each face the first claw element K1.1, 2.1, and therefore the first claw elements K1.1, K2.1 can be brought into engagement with the second claw elements K1.2, K2.2 and thus with the movable gears Z1, Z3, Z5, Z7 in a form-fitting manner.

In some implementations, both clutch units K1, K2 are illustrated in an open state. That is, the transmission 1 is in a neutral position, with none of the movable gears Z1, Z3, Z5, Z7 being connected to the second transmission shaft 4.

To engage a first transmission gear G1, the first clutch unit K1 is moved in the direction of the movable gear Z1 for the first transmission gear G1. The clutch toothing KV arranged on the first claw element K1.1 is brought into engagement in a form-fitting manner with the toothing VZL of the second claw element K1.2, which is formed integrally with the movable gear Z1, in a tooth-on-tooth-gap position ZLS (shown in FIG. 2).

As a result, the movable gear Z1 is connected non-rotatably to the second transmission shaft 4 and the second transmission shaft 4 is functionally coupled to the transmission input shaft 2 by the first pair of gearwheels ZP1. Thus, the second transmission shaft 4 is driven starting from the transmission input shaft 2 via the first pair of gearwheels ZP1.

By shifting the following transmission gears G2 to G4, a torque is transmitted from the first transmission shaft 3 to the second transmission shaft 4. This torque is then transmitted via a transmission output shaft 5, which is arranged coaxially with respect to the second transmission shaft 4, to an output unit (not illustrated) which, for example, includes a differential transmission which drives axle drive shafts for drive wheels of the vehicle, for example front drive wheels.

The form-fitting connection between the toothing VZL of the second claw element K1.2, K2.2 and the clutch toothing KV on the first claw element K1.1, K2.1 takes place in what is referred to as a tooth-on-tooth-gap position ZLS (see FIG. 2), in which, for example, a tooth of the clutch toothing KV engages in a form-fitting manner in a tooth gap of the toothing VZL. If, on the other hand, two teeth (one of the toothing VZL and one of the clutch toothing KV) meet, this can lead to the toothings VZL jamming or to a delayed form-fitting connection. This is noticeable in the driving mode by a prolonged and noisy shifting operation.

To reduce such problems, the transmission mechanism GM provides a sensor device 6 and a control unit 7 which is coupled thereto and by way of which an absolute angular relationship WB between the toothing VZL of the movable gear Z3, Z5, Z7 and the clutch toothing KV can be determined and, resulting therefrom, so too can a clutch position between the toothing VZL and the clutch toothing KV, for example, a tooth-on-tooth-gap position ZLS or a tooth-on-tooth position (not shown) be determined. In some examples, a clutch region between the toothing VZL and the clutch toothing KV can thus be monitored for their clutch position, for example, as to whether their teeth are in the tooth-on-tooth-gap position ZLS or in a tooth-before-tooth position. In some examples, the sensor device 6 and the control unit 7 detect and/or determine whether the first claw element K1.1, K2.1 and the second claw element K1.2, K2.2 are positioned in a tooth-on-tooth-gap position ZLS with respect to one another.

In some implementations, the sensor device 6 includes a first rotational speed sensor 6.1 coupled to the transmission input shaft 2 and a second rotational speed sensor 6.2 coupled to a transmission output shaft 5, which forms the transmission output side. The rotational speed sensors 6.1, 6.2 are each, for example, Hall sensors or inductive sensors and detect a rotational speed of the transmission input shaft 2 or the transmission output shaft 5.

The rotational speed sensors 6.1, 6.2 are also connected to a control unit 7 which is, for example, a transmission control unit of a vehicle. The control unit 7 evaluates the signals detected by the rotational speed sensors 6.1, 6.2, for example, an incoming rotational speed signal $n_{in}$ and an outgoing rotational speed signal $n_{out}$, which depict the rotational speeds of the transmission input shaft 2 and the transmission output shaft 5.

During the evaluation of the rotational speed signals $n_{in}$, $n_{out}$, a time stamp is stored for each edge in the signal. In other words: Each signal edge can be assigned to a fixed point in time.

During the evaluation of the detected rotational speed signals $n_{in}$, $n_{out}$, for each stored time stamp of an edge in the rotational speed signal $n_{in}$, $n_{out}$ a position, for example, an angular position WP of the toothing VZL of the movable gear Z3, Z5, Z7, for example, of the second claw element K1.2, K2.2, relative to the second transmission shaft 4 is detected and this angular position WP is assigned to the time stamp. Since, owing to the non-rotatable arrangement of the first claw element K1.1, K2.1 on the second transmission shaft 4, a position of the clutch toothing KV is known with reference to the evaluated rotational speed signals $n_{in}$, $n_{out}$ of the rotational speed sensors 6.1, 6.2, it is consequently possible, after an initial engagement of a transmission gear G1 to G4, for example of the first transmission gear G1, for an absolute angular relationship WB, for example, angular position WP between the toothing VZL of the second claw element K1.2, K2.2 and the clutch toothing KV of the first claw element K1.1, K2.1 to be determined.

If the control unit 7 determines the tooth-on-tooth-gap position ZLS shown in FIG. 2, the control unit activates the clutch unit K1, K2 for engaging the corresponding transmission gear G1 to G4 such that the first claw element K1.1, K2.1 engages in a form-fitting manner in the second claw element K1.2, K2.2 virtually without interference. If, on the other hand, the control unit 7 determines a tooth-before-tooth position (not shown), the clutch unit K1, K2 is moved relative to the movable gear Z3, Z5, Z7, for example, rotated step by step into the tooth-on-tooth-gap position ZLS.

The control unit 7 monitors the clutch region between the movable gear Z3, Z5, Z7 and the clutch unit K1, K2, for example, continuously or, in an event-controlled or time-controlled manner. In some examples, the control unit 7 can use the absolute angular relationship WB to determine a tooth-on-tooth-gap position ZLS even after disengaging the previously initially engaged transmission gear G1 to G4.

FIG. 1 schematically shows a detail from a top view of the tooth-on-tooth-gap position ZLS between the toothing VZL and the clutch toothing KV. For example, the tooth-on-tooth-gap position ZLS between the first claw element K1.1 and the second claw element K1.2 is illustrated. The flanks of the toothings VZL, KV are illustrated vertically here. In addition, the flanks can be provided with an undercut such that they are configured substantially to be dovetail-shaped.

By way of the described transmission mechanism GM, the clutch unit K1, K2 and therefore the engagement of a transmission gear G1 to G4 can thus be activated depending on the position of the toothing VZL of the movable gear Z1, Z3, Z5, Z7 or of the second claw element K1.2, K2.2 with respect to the clutch toothing KV of the first claw element K1.1, K2.1.

A number of implementations have been described. Nevertheless, it will be understood that various modifications may be made without departing from the spirit and scope of the disclosure. Accordingly, other implementations are within the scope of the following claims.

LIST OF REFERENCE SIGNS 1 transmission
2 transmission input shaft
3 first transmission shaft
4 second transmission shaft
5 transmission output shaft
6 sensor device
6.1, 6.2 rotational speed sensor
7 control unit
G1 to G4 transmission gear
GM transmission mechanism
K1, K2 clutch unit
K1.1, K2.1 first claw element
K1.2, K2.2 second claw element
KV clutch toothing
$n_{in}$ incoming rotational speed signal
$n_{out}$ outgoing rotational speed signal
VZL toothing
WP angular position
WB angular relationship
Z1 to Z8 gearwheel
Z1, Z3, Z5, Z7 movable gear
Z2, Z4, Z6, Z8 fixed gear
ZP1 to ZP4 pair of gearwheels
ZLS tooth-on-tooth-gap position

What is claimed is:

1. A transmission mechanism for a transmission, the transmission mechanism comprising:
 a transmission shaft;
 a further transmission shaft;
 at least two gearwheels that can be brought into form-fitting engagement with one another, one of the gearwheels designed as a movable gear and, in a disengaged position, arranged in a freely rotatable manner on the transmission shaft, the other one of the gearwheels designed as a fixed gear and arranged non-rotatably on the further transmission shaft, the movable gear connectable non-rotatably to the transmission shaft by a clutch unit and at least one transmission gear can be engaged if a clutch toothing of the clutch unit engages in a form-fitting manner in a toothing of the movable gear in a tooth-on-tooth-gap position;
 a sensor device detecting a rotational speed signal incoming into the transmission shaft and a rotational speed signal outgoing from the other transmission shaft;
 a control unit coupled to the sensor device, the control unit:
  determining and storing a time stamp for each detected edge in the respective rotational speed signal,
  after an initial engagement of the at least one transmission gear, determining an angular position of the toothing of the movable gear relative to the transmission shaft, and assigning the angular position to the time stamp, and
  determining an absolute angular relationship between the toothing of the movable gear and the clutch toothing based on the time stamp and the angular position assigned to the time stamp.

2. The transmission mechanism of claim 1, wherein the control unit activates the clutch unit based on the determined absolute angular relationship.

3. The transmission mechanism of claim 2, wherein the control unit determines a tooth-on-tooth-gap position between the toothing of the movable gear and the clutch toothing based on the absolute angular relationship.

4. The transmission mechanism of claim 3, wherein the tooth-on-tooth-gap position is determined continuously or in an event-controlled or time-controlled manner.

5. The transmission mechanism of claim 1, wherein the sensor device has at least two rotational speed sensors.

6. The transmission mechanism of claim 5, wherein the sensor device includes:
 one rotational speed sensor arranged at or on a transmission input shaft, and
 another rotational speed sensor arranged at or on a transmission output shaft.

7. The transmission mechanism of claim 6, wherein the rotational speed sensors are each designed as a Hall sensor.

8. The transmission mechanism of claim 1, wherein the clutch unit is designed as a claw clutch.

9. The transmission mechanism as claimed in claim 8, wherein the clutch unit is formed in two parts and has a first claw element and a second claw element, the first claw element is connected non-rotatably to the transmission shaft and the second claw element is formed integrally with the movable gear.

10. The transmission mechanism of claim 1, wherein the transmission is a vehicle transmission.

* * * * *